United States Patent
Liu et al.

(10) Patent No.: US 7,286,373 B1
(45) Date of Patent: Oct. 23, 2007

(54) FULL-RESONANT POWER CIRCUIT DEVICE FOR RECEIVING A VARIABLE INPUT VOLTAGE

(75) Inventors: Chih-Lung Liu, Taoyuan (TW); Tsai-Liang Hsu, Bade (TW)

(73) Assignee: Li Shin International Enterprise Corporation, Taoyuan Hsien (TW)

( * ) Notice: Subject to any disclaimer, the term of this patent is extended or adjusted under 35 U.S.C. 154(b) by 64 days.

(21) Appl. No.: 11/399,329

(22) Filed: Apr. 7, 2006

(51) Int. Cl.
*H02M 3/335* (2006.01)

(52) U.S. Cl. ..................... 363/16; 363/21.02

(58) Field of Classification Search .................. 363/16, 363/17, 19, 20, 21.01, 21.02, 21.03, 97, 98, 363/131, 132
See application file for complete search history.

(56) References Cited

U.S. PATENT DOCUMENTS

| | | | |
|---|---|---|---|
| 5,768,112 A | * | 6/1998 | Barrett ........................ 363/16 |
| 5,986,895 A | * | 11/1999 | Stewart et al. ................ 363/16 |
| 6,061,253 A | * | 5/2000 | Igarashi et al. ............... 363/19 |
| 7,110,269 B2 | * | 9/2006 | Cao et al. ................. 363/21.03 |

* cited by examiner

*Primary Examiner*—Jessica Han
(74) *Attorney, Agent, or Firm*—Rosenberg, Klein & Lee

(57) ABSTRACT

The present invention provides a full-resonant power circuit device for receiving a variable input voltage that a power factor correcting circuit for separating a variable input voltage AC into a plurality of supply voltages, and the input voltage sections are detected to separately switch corresponding switch transistors for suitably adding resonance inductors to the input voltage sections to be used by the full-resonant power circuit device to reduce the large voltage difference of a conventional power factor corrector so as to improve the efficiency of the power circuit device and improve a half-bridge resonance circuit that is only operated in a fixed voltage source.

10 Claims, 4 Drawing Sheets

FULL-RESONANT POWER CIRCUIT DEVICE FOR RECEIVING A VARIABLE INPUT VOLTAGE

BACKGROUND OF THE INVENTION

1. Field of the Invention

The present invention relates to a full-resonant power circuit device for receiving a variable input voltage, and more particularly, the full-resonant power circuit device switches to vary a resonance inductor for providing a stable voltage to a load in response to the variable input voltage.

2. Description of the Prior Art

Reference is made from FIG. 1, which is a schematic view of a half-bridge full-resonant converter of the prior art. In the present day, a structure of a full-resonant converter is based on a half-bridge topology or a full-bridge topology. A switch $Q_1$ and a switch $Q_2$ are connected to be a half-bridge structure and are switched by a variable switching frequency controlling method. When a switching frequency between the switch $Q_1$ and switch $Q_2$ is higher than a resonance frequency obtained from a resonance capacitor $C_r$ and a resonance inductor $L_r$, the switch $Q_1$ and the switch $Q_2$ are conducted at a zero voltage for reducing the consumption of the switch $Q_1$ and the switch $Q_2$ therebetween. Moreover, the half-bridge full-resonant power circuit adjusts the switching frequency between the switch $Q_1$ and the switch $Q_2$ or the resonance frequency obtained from the resonance capacitor $C_r$ and the resonance inductor $L_r$ for adjusting a magnitude of an output voltage $V_o$.

However, no matter the half-bridge or the full-bridge full-resonant converter, for obtaining the stabilization of the output voltage $V_o$, the value of the resonance inductor $L_r$ should be designed in response to a variational input voltage AC. Hence, the range of the variational input voltage AC can't too large for the half-bridge or the full-bridge full-resonant converter.

Reference is made from FIG. 2, which is schematic view of the half-bridge full-resonant converter with a power factor corrector (PFC) of the prior art. The half-bridge full-resonant converter is often applied to supply a high power, and due to the high power of the full-resonant converter, the power factor of the full-resonant converter is relatively low. Therefore, it is often to use a power factor corrector 2 to improve the power factor so as to conform to the IEC61000-3-2 standards. And the power factor corrector 2 not only improves the power factor but provides a stable voltage to the full-resonant converter so as to stabilize the output voltage $V_o$ thereof. However, the power factor corrector 2 boosts variational input voltage AC into a supply voltage $V_{in}$ for being used by the full-resonant converter, the power factor corrector 2 will produce a high current in the conversion condition to increase the consumption of a switch transistor $Q_{PFC}$ of the power factor corrector 2 so as to reduce the efficiency of the power circuit device.

The inventor of the present invention recognizes the above shortage should be corrected and special effort has been paid to research this field. The present invention is presented with reasonable design and good effect to resolve the above problems.

SUMMARY OF THE INVENTION

The present invention provides a full-resonant power circuit device for receiving a variable input voltage, wherein a power factor correcting circuit separates the variable input voltage into a plurality of power voltages. The full-resonant power circuit device controls the switch transistors for switching so as to feed proper resonance inductors by detecting the variable input voltage and improve the efficiency of the power circuit device.

In a first embodiment of the present invention, a power factor corrector for receiving a variable input voltage and boosting the variable input voltage to be a supply voltage, and a square wave generator for producing a series of square wave voltages in response to the supply voltages. Moreover, the present invention has a primary resonance loop coupled with the square wave generator, includes a serial capacitor, a first serial inductor, and a second serial inductor that are mutually serially connected, and a first switch is coupled with the primary resonance loop. And at least one secondary resonance loop is coupled with the square wave generator, have the serial capacitor is coupled with the first serial inductor and the first serial inductor is coupled with at least one auxiliary serial inductor, and at least one second switch is separately coupled with the secondary resonance loops. And a rectifier circuit coupled with the primary resonance loop for outputting a direct current (DC) voltage in response to the series of square wave, and a voltage detector for detecting the variable input voltage, and separately controlling the first switch to conduct a function of the primary resonance loop and the second switch to conduct a function of the secondary resonance loop in response to a magnitude of the variable input voltage.

In a second embodiment of the present invention, a power factor corrector for receiving a variable input voltage and boosting the variable input voltage to be a supply voltage, and a square wave generator for producing a series of square wave voltages in response to the supply voltages. Moreover, the present invention has a primary resonance loop coupled with the square wave generator, includes a serial capacitor, a first serial inductor, and a second serial inductor that are mutually serially connected, and a first switch is coupled with the primary resonance loop. And at least one secondary resonance loop is coupled with the square wave generator, have the first serial inductor is coupled with at least one auxiliary serial capacitor, and at least one second switch is separately coupled with the secondary resonance loops. And a rectifier circuit coupled with the primary resonance loop for outputting a direct current (DC) voltage in response to the series of square wave, and a voltage detector for detecting the variable input voltage, and separately controlling the first switch to conduct a function of the primary resonance loop and the second switch to conduct a function of the secondary resonance loop in response to a magnitude of the variable input voltage.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
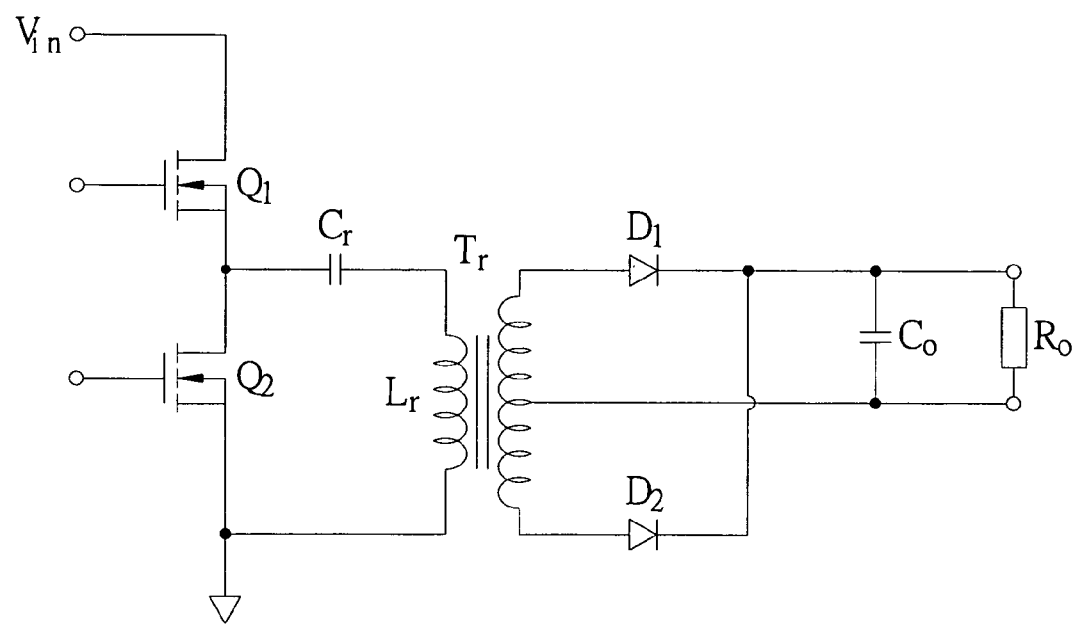
FIG. 1 is a schematic view of a half-bridge full-resonant converter of the prior art.
Figure 2:
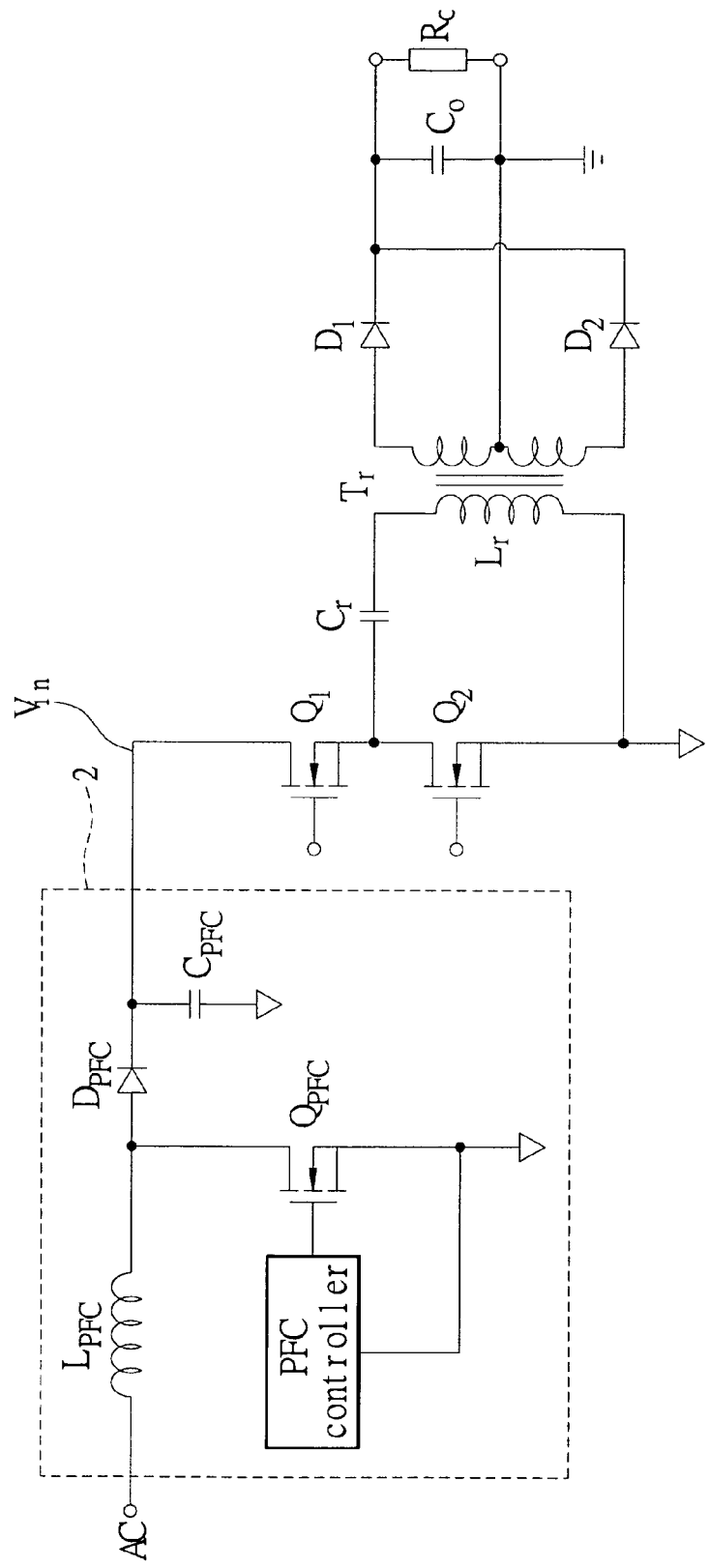
FIG. 2 is schematic view of the half-bridge full-resonant converter with a power factor corrector (PFC) of the prior art.
Figure 3:
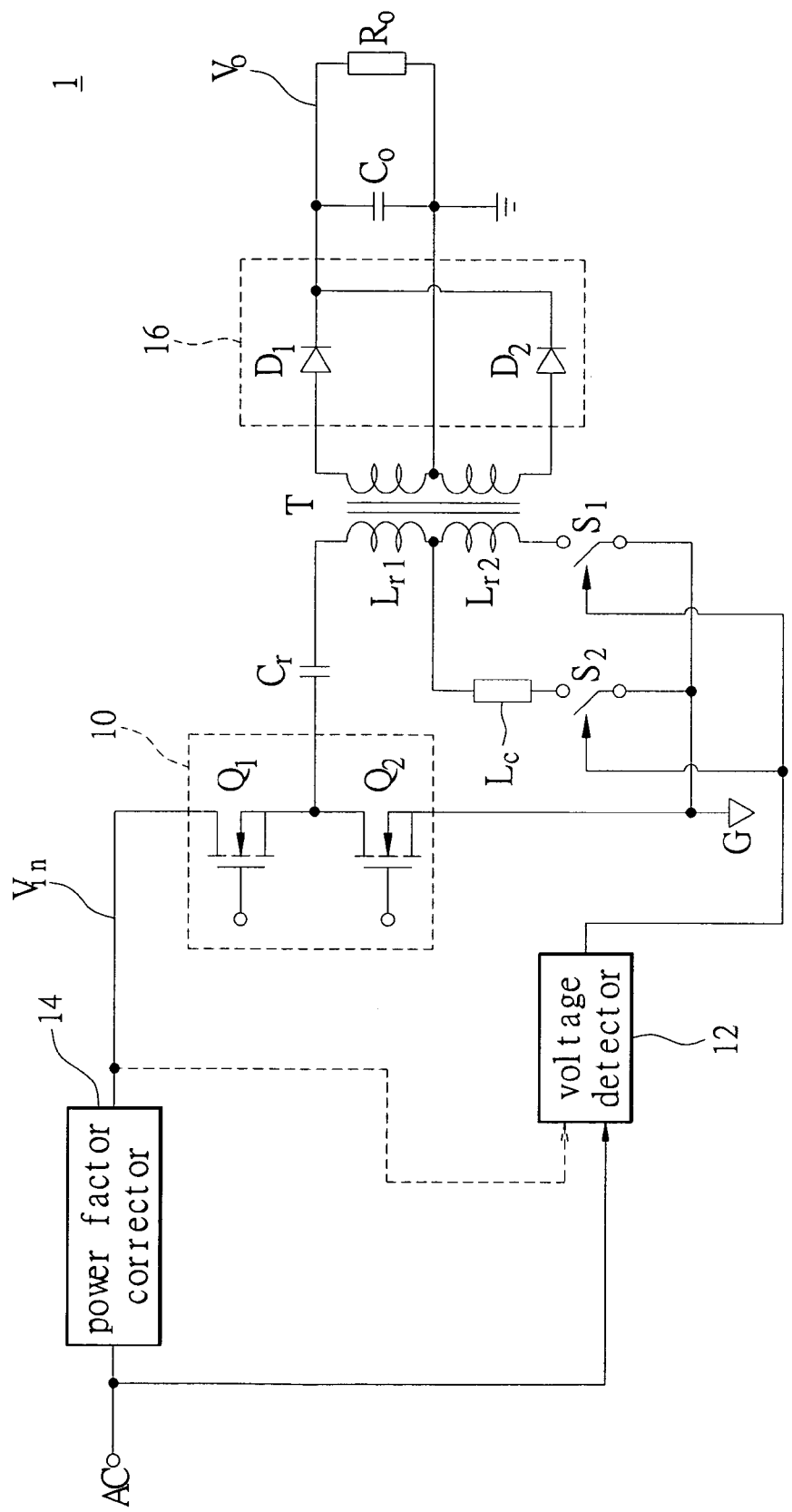
FIG. 3 is a schematic view of a first embodiment of a full-resonant power circuit device for receiving a variable input voltage of the present invention.

Reference is made from FIG. 3, which is a schematic view of a first embodiment of a full-resonant power circuit device for receiving a variable input voltage of the present invention. The half-bridge full-resonant power circuit device 1 includes a power factor corrector 14 receives the variable input voltage AC and boosting the variable input voltage AC to be a supply voltage $V_{in}$, and a square wave generator 10 is coupled with the power factor corrector 14 for producing a series of square wave voltages (not shown) in response to the supply voltages $V_{in}$ and the square wave generator 10 has switches $Q_1$, $Q_2$ connected to be a half-bridge structure or four switches (not shown) connected to be a full-bridge structure. A primary resonance loop is coupled with the square wave generator 10, has a serial capacitor $C_r$ is coupled with a first serial inductor $L_{r1}$ and the first serial inductor $L_{r1}$ is coupled with a second serial inductor $L_{r2}$, and a first switch $S_1$ is coupled with the primary resonance loop and a ground reference G. A secondary resonance loop is coupled with the square wave generator 10, has the serial capacitor $C_r$ is coupled with the first serial inductor $L_{r1}$ and the first serial inductor $L_{r1}$ is coupled with an auxiliary serial inductor $L_c$, and a second switch $S_2$ is separately coupled with the secondary resonance loop and the ground reference G.

The half-bridge full-resonant power circuit device 1 further comprises a transformer T, a primary side of the transformer T has the first serial inductor $L_{r1}$ and the second serial inductor $L_{r2}$ and a secondary side of the transformer T is coupled with a rectifier circuit 16, and the transformer T receiving the series of square wave voltages for providing a direct current (DC) voltage $V_o$ to a load circuit $R_o$ and the rectifier circuit 16 is a center tap rectifier circuit. A voltage detector 12 for detecting the variable input voltage AC or the supply voltages $V_{in}$, and separately controlling the first switch $S_1$ to conduct a function of the primary resonance loop and the second switch $S_2$ to conduct a function of the secondary resonance loop according to a magnitude of the variable input voltage AC or the supply voltages $V_{in}$.

The power factor corrector 14 is used to divide the variable input voltage AC into an AC low voltage (90-132 volts) and an AC high voltage (180-264 volts) so as to make the voltages conform to specifications of a global common variable input voltage AC. In AC low voltage, the power factor corrector 14 detects the AC low voltage and boosts it to a 240-volt supply voltage; in AC high voltage, the power factor corrector 14 detects the AC high voltage and boosts it to 400-volt supply voltage. Hence, a voltage difference between an input end (90-132 volts or 180-264 volts) of the power factor corrector 14 and an output end (240 volts or 400 volts) of the power factor corrector 14 is smaller than a voltage difference of the conventional power factor corrector, a current is relatively smaller, and losses of a switch transistor $Q_{PFC}$ of the power factor corrector 14 are smaller so as to improve the efficiency of the power circuit device. Moreover, the power factor corrector 14 is also used to divide the variable input voltage AC into a plurality of sections so as to output different kinds of the supply voltages $V_{in}$.

The voltage detector 12 of the half-bridge full-resonant power circuit device 1 for receiving the variable input voltage AC and the supply voltages $V_{in}$ to switch the first switch $S_1$ or the second switches $S_2$ according to the fluctuation of the variable input voltage AC and the supply voltages $V_{in}$ to suitably add resonance inductor $L_r$ to be used for adjusting a resonance frequency to stabilize the output voltage $V_o$.

When the voltage detector 12 detects a high voltage, i.e. the first switch $S_1$ is conducted, the serial capacitor $C_r$, the first serial inductor $L_{r1}$, and the second serial inductor $L_{r2}$ are mutually coupled as the primary resonance loop and a resonance inductor $L_r$ equals $L_{r1}$ plus $L_{r2}$ (i.e. $L_r = L_{r1} + L_{r2}$) for providing the resonance frequency and larger winding numbers for the resonance circuit. When the voltage detector 12 detects a low voltage, i.e. the second switch $S_2$ is conducted, the serial capacitor $C_r$, the first serial inductor $L_{r1}$, and the auxiliary serial inductor $L_c$ are mutually coupled as the secondary resonance loop and a resonance inductor $L_r$ equals $L_{r1}$ plus $L_c$ (i.e. $L_r = L_{r1} + L_c$) for providing the resonance frequency and smaller winding numbers for the resonance circuit.

In this embodiment of the present invention, the resonance loop can have a wide expansion. When the power factor corrector 14 divides the variable input voltage AC into a plurality of sections to output different kinds of supply voltages $V_{in}$, the secondary resonance loop has more one second switches $S_2$ and a plurality of auxiliary serial inductors $L_c$ to obtain a multi-section adjustment of the secondary resonance loop. Hence, a voltage difference between the input end of the power factor corrector 14 and the output end of the power factor corrector 14 is minimal and losses of the switch transistor $Q_{PFC}$ of the power factor corrector 14 are relatively minimal so as to improve the efficiency of the power circuit device. Moreover, the first switches $S_1$ and the second switches $S_2$ of the present invention are widely selected such as BJTs, MOSFETs, SCRs, RELAYs, IGBT, or so on.

Figure 4:
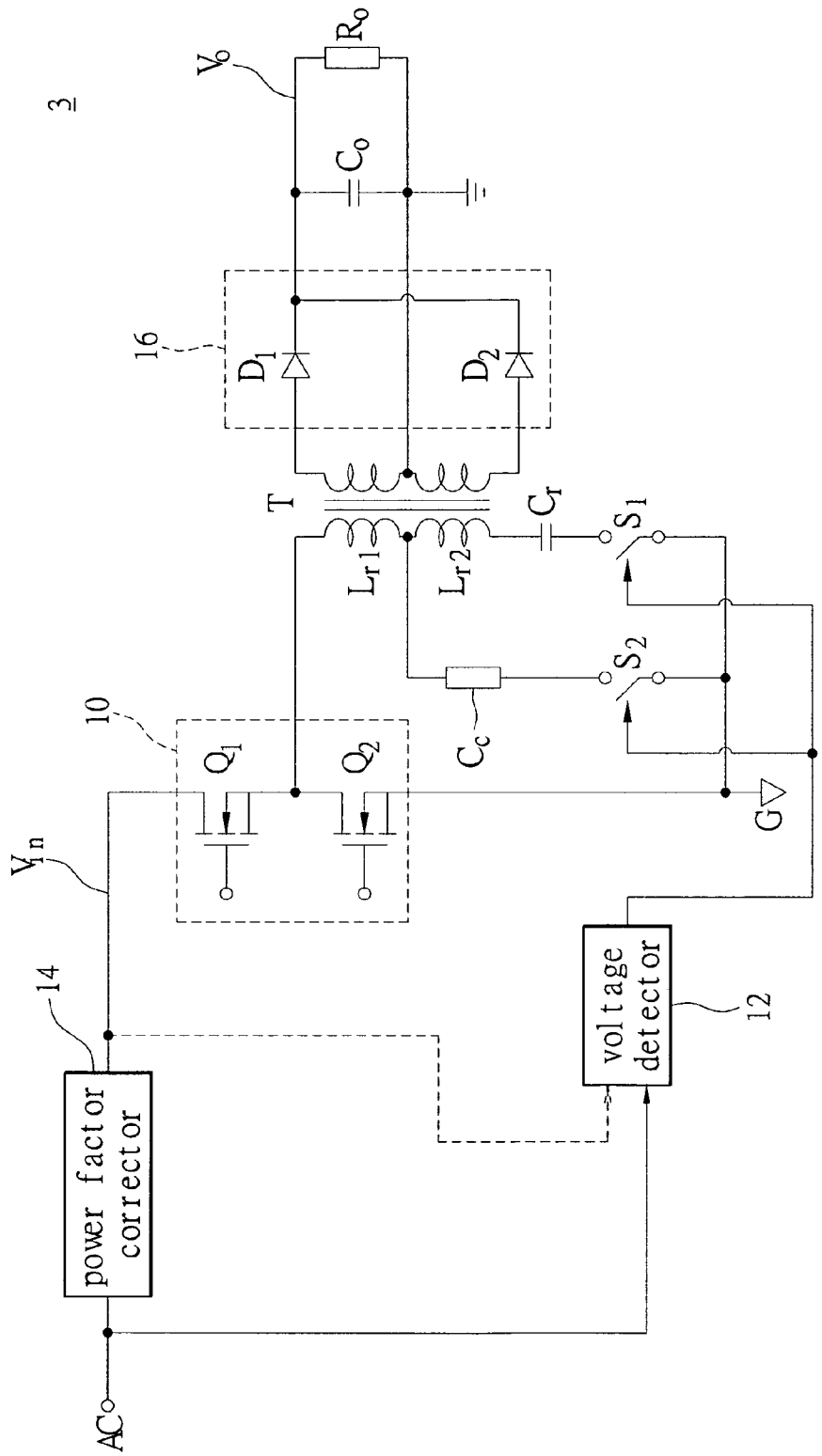
FIG. 4 is a schematic view of a second embodiment of the full-resonant power circuit device for receiving a variable input voltage of the present invention.

Reference is made from FIG. 4, which is a schematic view of a second embodiment of the full-resonant power circuit device for receiving a variable input voltage of the present invention. The differences between the half-bridge full-resonant power circuit device 1 and the half-bridge full-resonant power circuit device 3 are the primary resonance loops and the secondary resonance loops.

The primary resonance loop of the half-bridge full-resonant power circuit device 3 has a serial capacitor $C_r$, a first serial inductor $L_{r1}$, and a second serial inductor $L_{r2}$ are mutually connected, and a first switch $S_1$ is coupled with the primary resonance loop and a ground reference G; the secondary resonance loop has the first serial inductor $L_{r1}$ and an auxiliary serial capacitor $C_c$ are mutually connected, and a first switch $S_2$ is coupled with the secondary resonance loop and the ground reference G.

The voltage detector 12 of the half-bridge full-resonant power circuit device 3 for receiving the variable input voltage AC and the supply voltages $V_{in}$ to switch the first switch $S_1$ or the second switches $S_2$ according to the fluctuation of the variable input voltage AC and the supply voltages $V_{in}$ to suitably add resonance inductor $L_r$ to be used for adjusting a resonance frequency to stabilize the output voltage $V_o$.

When the voltage detector 12 detects a high voltage, i.e. the first switch $S_1$ is conducted, the serial capacitor $C_r$, the first serial inductor $L_{r1}$, and the second serial inductor $L_{r2}$ are mutually coupled as the primary resonance loop and a resonance inductor $L_r$ equals $L_{r1}$ plus $L_{r2}$ (i.e. $L_r=L_{r1}+L_{r2}$) for providing the resonance frequency and larger winding numbers for the resonance circuit. When the voltage detector 12 detects a low voltage, i.e. the second switch $S_2$ is conducted, the first serial inductor $L_{r1}$ and the auxiliary serial capacitor $C_c$ are mutually coupled as the secondary resonance loop and a resonance inductor $L_r$ equals $L_{r1}$ (i.e. $L_r=L_{r1}$) for providing the resonance frequency and smaller winding numbers for the resonance circuit.

In this embodiment of the present invention, the resonance loop can have a wide expansion. When the power factor corrector 14 divides the variable input voltage AC into a plurality of sections to output different kinds of supply voltages $V_{in}$, the secondary resonance loop has more one second switches $S_2$ and a plurality of auxiliary serial capacitor $C_c$ to obtain a multi-section adjustment of the secondary resonance loop. Hence, a voltage difference between the input end of the power factor corrector 14 and the output end of the power factor corrector 14 is minimal and losses of the switch transistor $Q_{PFC}$ of the power factor corrector 14 are relatively minimal so as to improve the efficiency of the power circuit device. Moreover, the first switches $S_1$ and the second switches $S_2$ of the present invention are widely selected such as BJTs, MOSFETs, SCRs, RELAYs, IGBT, or so on.

It follows from what has been said that the full-resonant power circuit device for receiving a variable input voltage that the power factor correcting circuit for separating the variable input voltage AC into a plurality of supply voltage sections outputted, and the input voltage sections are detected to separately switch corresponding switch transistors for suitably adding resonance inductors to the input voltage sections to be used by the full-resonant power circuit device to reduce the large voltage difference of a conventional power factor corrector 2 so as to improve the efficiency of the power circuit device and improve a half-bridge resonance circuit that is only operated in a fixed voltage source.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A full-resonant power circuit device for receiving a variable input voltage, comprising:
    a power factor corrector received the variable input voltage for boosting the variable input voltage into a supply voltage;
    a square wave generator coupled with the power factor corrector for producing a series of square wave voltages in response to the supply voltage;
    a primary resonance loop coupled with the square wave generator and composed of a serial capacitor, a first serial inductor and a second serial inductor, wherein the serial capacitor coupled with the first serial inductor and the first serial inductor coupled with the second serial inductor;
    a first switch coupled with the primary resonance loop;
    at least one secondary resonance loop coupled with the square wave generator and composed of the serial capacitor, the first serial inductor and at least one auxiliary serial inductor, wherein the serial capacitor coupled with the first serial inductor and the first serial inductor coupled with the auxiliary serial inductor;
    at least one second switch separately coupled with the secondary resonance loop;
    a rectifier circuit coupled with the primary resonance loop for outputting a direct current (DC) voltage in response to the series of square wave voltages; and
    a voltage detector for detecting the variable input voltage and separately controlling the first switch and the second switch in response to the variable input voltage.

2. The full-resonant power circuit device as in claim 1, wherein the square wave generator has two switches connected to be a half-bridge structure for generating the square wave voltages.

3. The full-resonant power circuit device as in claim 1, wherein the square wave generator has four switches connected to be a full-bridge structure for generating the square wave voltages.

4. The full-resonant power circuit device as in claim 1, wherein the voltage detector detects the variable input voltage, and separately controls the first switch to conduct the function of the primary resonance loop or the second switch to conduct the function of the secondary resonance loop in response to the variable input voltage.

5. The full-resonant power circuit device as in claim 1, wherein the rectifier circuit is a center tap rectifier circuit.

6. A full-resonant power circuit device for receiving a variable input voltage, comprising:
    a power factor corrector received the variable input voltage for boosting the variable input voltage into a supply voltage;
    a square wave generator coupled with the power factor corrector for producing a series of square wave voltages in response to the supply voltage;
    a primary resonance loop coupled with the square wave generator and composed of a serial capacitor, a first serial inductor and a second serial inductor, wherein the serial capacitor coupled with the first serial inductor and the first serial inductor coupled with the second serial inductor;
    a first switch coupled with the primary resonance loop;
    at least one secondary resonance loop coupled with the square wave generator and composed of the first serial inductor and at least one auxiliary serial inductor, herein the first serial inductor coupled with the auxiliary serial inductor;
    at least one second switch separately coupled with the secondary resonance loop;
    a rectifier circuit coupled with the primary resonance loop for outputting a direct current (DC) voltage in response to the series of square wave voltages; and
    a voltage detector for detecting the variable input voltage and separately controlling the first switch and the second switch in response to the variable input voltage.

7. The full-resonant power circuit device as in claim 6, wherein the square wave generator has two switches connected to be a half-bridge structure for generating the square wave voltages.

8. The full-resonant power circuit device as in claim 6, wherein the square wave generator has four switches connected to be a full-bridge structure for generating the square wave voltages.

9. The full-resonant power circuit device as in claim 6, wherein the voltage detector for detects the input voltage, and separately controls the first switch to conduct the function of the primary resonance loop or the second switch to conduct the function of the secondary resonance loop in response to a magnitude of the input voltage.

10. The full-resonant power circuit device as in claim 6, wherein the rectifier circuit is a center tap rectifier circuit.

* * * * *